United States Patent [19]
Kakida et al.

[11] Patent Number: 5,240,103
[45] Date of Patent: Aug. 31, 1993

[54] WORK CONVEYING SYSTEM FOR USE IN CAR BODY ASSEMBLING LINE

[75] Inventors: Takuya Kakida; Shoiti Okada; Akiyoshi Kimura, all of Kurashiki; Yuji Watanabe, Kojima, all of Japan

[73] Assignee: Mitsubishi Jidosha Kogyo Kabushiki Kaisha, Tokyo, Japan

[21] Appl. No.: 950,881

[22] Filed: Sep. 25, 1992

[30] Foreign Application Priority Data

Sep. 26, 1991 [JP] Japan ............................ 3-78070[U]
Sep. 30, 1991 [JP] Japan ............................ 3-79301[U]

[51] Int. Cl.⁵ .......................................... B65G 17/32
[52] U.S. Cl. .............................. 198/680; 198/476.1; 198/485.1; 104/172.4; 105/148
[58] Field of Search ............. 198/485.1, 476.1, 477.1; 104/172.4; 105/148, 150, 241.2

[56] References Cited

U.S. PATENT DOCUMENTS

| | | | |
|---|---|---|---|
| 4,464,998 | 8/1984 | Wakabayashi | 105/148 |
| 4,881,488 | 11/1989 | Fantacci | 198/680 |
| 4,909,155 | 3/1990 | Katayama | 105/148 |

FOREIGN PATENT DOCUMENTS

2-295896 12/1990 Japan ............................. 198/680
797981 1/1981 U.S.S.R. ....................... 198/680

*Primary Examiner*—Joseph E. Valenza

[57] ABSTRACT

A work conveying system used for conveying works such as side body panels in a car body assembling line. The system comprises hanger units, routes for conveying the hanger units which hold works to be carried, and opening-and-closing mechanisms. The hanger units are opened at a work loading or delivery area by the opening-and-closing mechanism.

7 Claims, 6 Drawing Sheets

WORK CONVEYING SYSTEM FOR USE IN CAR BODY ASSEMBLING LINE

BACKGROUND OF THE INVENTION

1. Field of the Invention

This invention relates to a work conveying system for conveying works along a car body assembling line.

2. Description of the Related Art

In an automobile manufacturing factory, a conveying system including hanger units is used to convey works such as side body panels to be assembled into a car. Such conveying system carries the works by holding them by hanger units. FIG. 6 of the accompanying drawings shows an example of such conveying system. The conveying system comprises a support unit, a hanger unit, and an opening-and-closing mechanism.

The support unit supports the hanger units, and includes a pair of guide rails 2 installed on an immovable member 1 of factory building structures, drive members 4, and rollers housed in drive members 4.

Each hanger unit is suspended from the support unit, and includes a hanger frame 3, rotatable shafts 5, pieces (6) extending orthogonally of the moving direction of the frame 3, and hanger arms 7 extending downwardly from the frame 3 so as to sandwich a work therebetween.

The opening-and-closing mechanism, which is located at work loading areas so as to control the operation of the hanger units, includes supports 8, pressure cylinders 9, and movable arms 10. The opening-and-closing mechanism is secured to the immovable member 1 of the factory building structures. The pressure cylinders 9 are connected to the supports 8, to which movable arms 10 are coupled.

When the hanger unit reaches the work loading area, the opening-and-closing mechanism operates the pressure cylinders 9 so as to rock the movable arms 10, which then engage with the extending members 6 of the hanger unit, thereby moving the hanger arms 7 to their open positions.

With the foregoing opening-and-closing mechanism, the movable arms 10 control the rocking motion of the hanger arms. However, while the hanger arms are closed, i.e. while the hanger arms are sandwiching the work therebetween, they are not protected against their accidental rocking motion. Furthermore, the hanger arms might happen to be rocked by the weight of the work sandwiched therebetween.

Sometimes a distance between a pair of the guide rails for guiding the hanger units may be narrowed due to a limited available space for installing the work conveying system. In such a case, hanger units on adjacent conveying routes may interfere with one another, and the opening-and-closing mechanisms have to be installed substantially near the hanger units. Occasionally, the opening-and-closing mechanisms have to be located above the guide rails, which may prevent the movement of the hanger units on the guide rails. Furthermore, the foregoing opening-and-closing mechanisms are independently provided for the right and left hanger arms, respectively, which requires a lot of space in the factory.

SUMMARY OF THE INVENTION

With the foregoing problems of the related art in mind, it is an object of this invention to provide a work conveying system which can move the hanger units smoothly along guide rails which are disposed with a narrow space therebetween, so as to enhance efficiency of the automobile manufacturing operation.

Another object of the invention is to provide the work conveying system which can assure safe operation of the hanger units.

According to the present invention, there is provided a work conveying system comprising: a plurality of hanger units which move along conveying routes over a car body assembling line and carry a work with their hanger arms, and at least one opening-and-closing mechanism located near one of the conveying routes at a work loading or delivery area where the hanger units are opened. The opening-and-closing mechanism takes the operating position to let the hanger unit receive or deliver works, and a non-operating position where the opening-and-closing mechanism does not interfere with the movement of hanger units.

DETAILED DESCRIPTION

Figure 1:
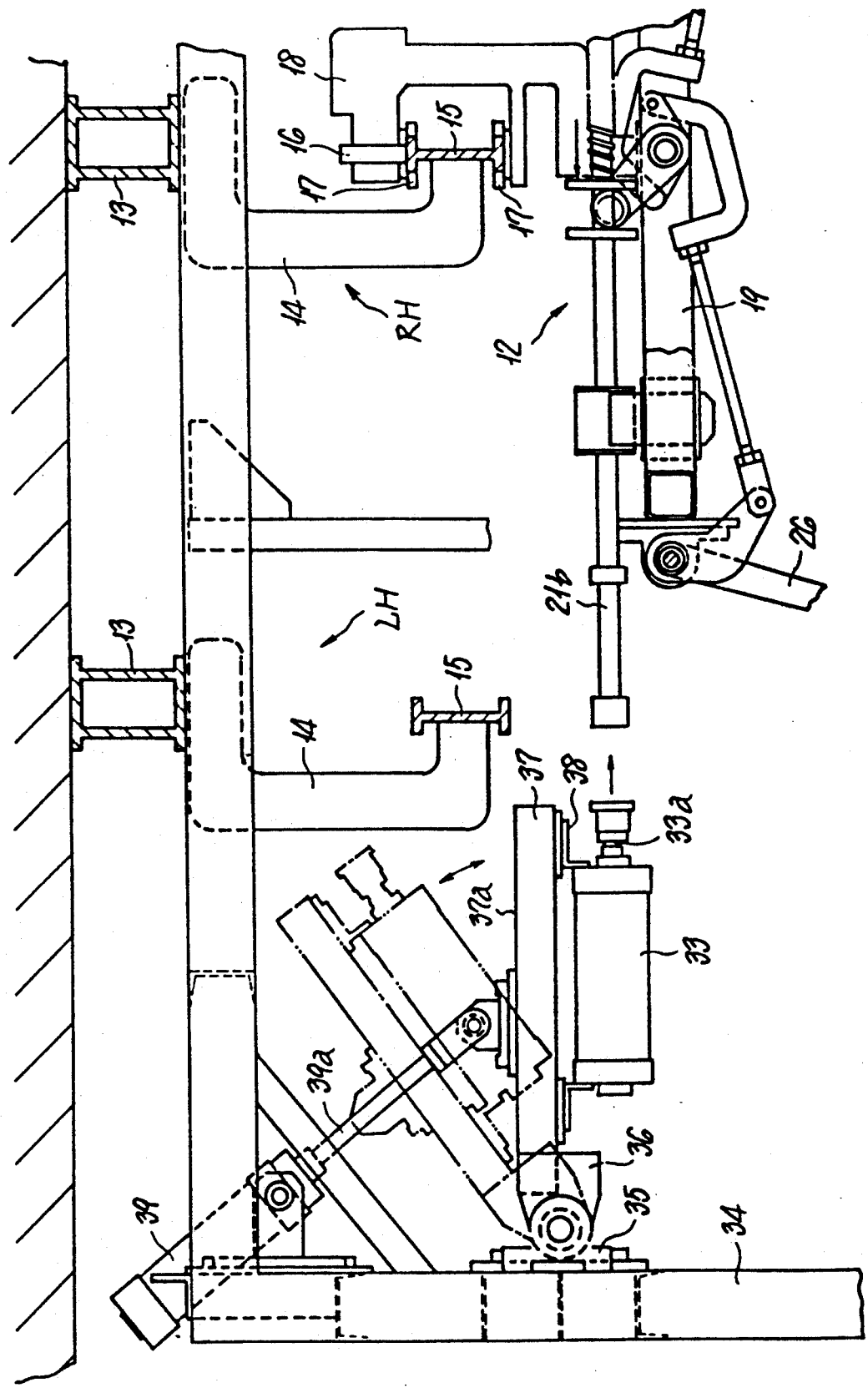
FIG. 1 is a side cross-sectional view of a work conveying system according to an embodiment of the present invention, showing the arrangement and operation of an opening-and-closing mechanism.

A work conveying system according to the present invention will be described with reference to the drawing figures.

Figure 2:
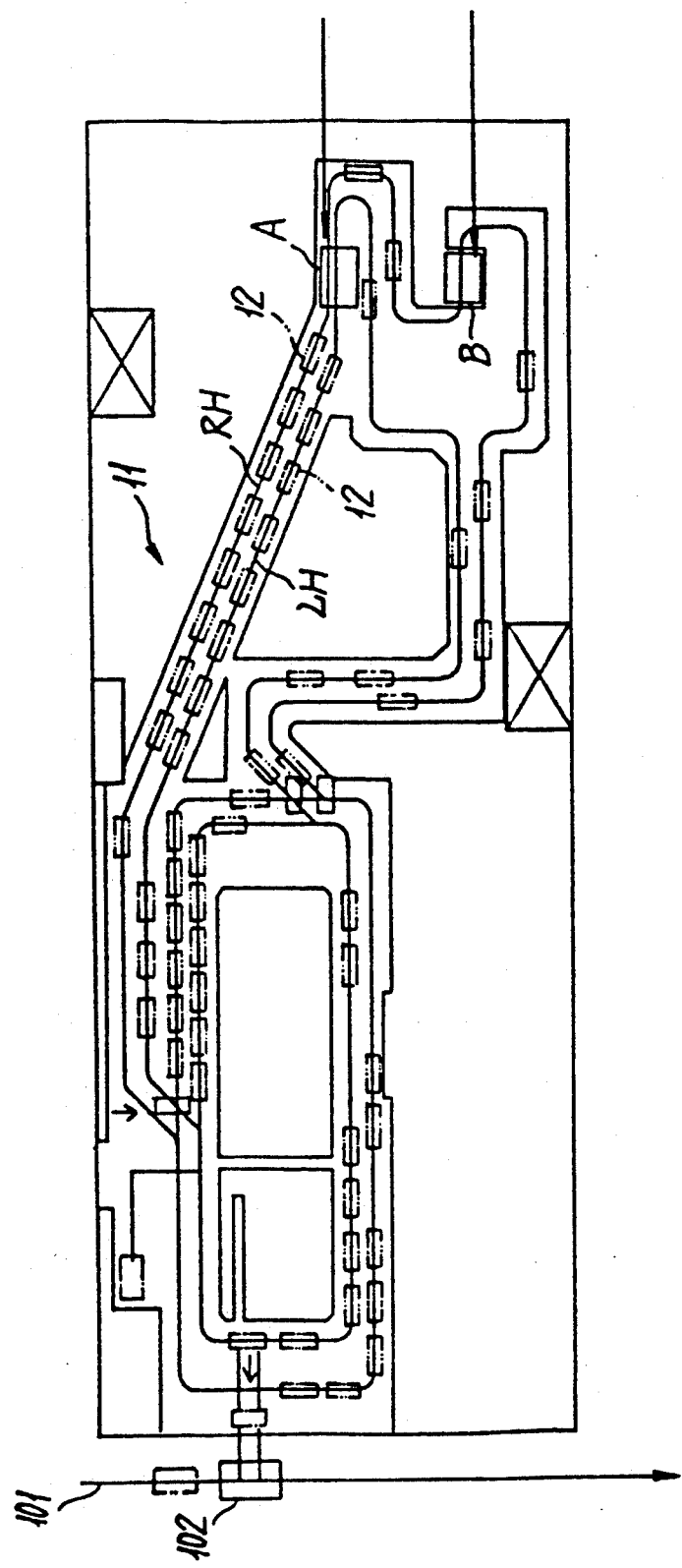
FIG. 2 is a plan view showing an assembling line where the work conveying system of FIG. 1 is applied.

The work conveying system comprises guide units, hanger units and opening-and-closing mechanisms to be described later. As shown in FIG. 2, the work conveying system is assumed to be applied to an automobile body assembling line 11, which comprises two conveying routes RH and LH, and work loading areas A and B. The hanger units of the work conveying system are guided along these conveying routes RH and LH, which are connected to a floor line 101 at a delivery area 102. The hanger units convey the works, e.g. right and left side body panels in this case, from the work loading areas A and B to the work delivery area 102.

Figure 3:
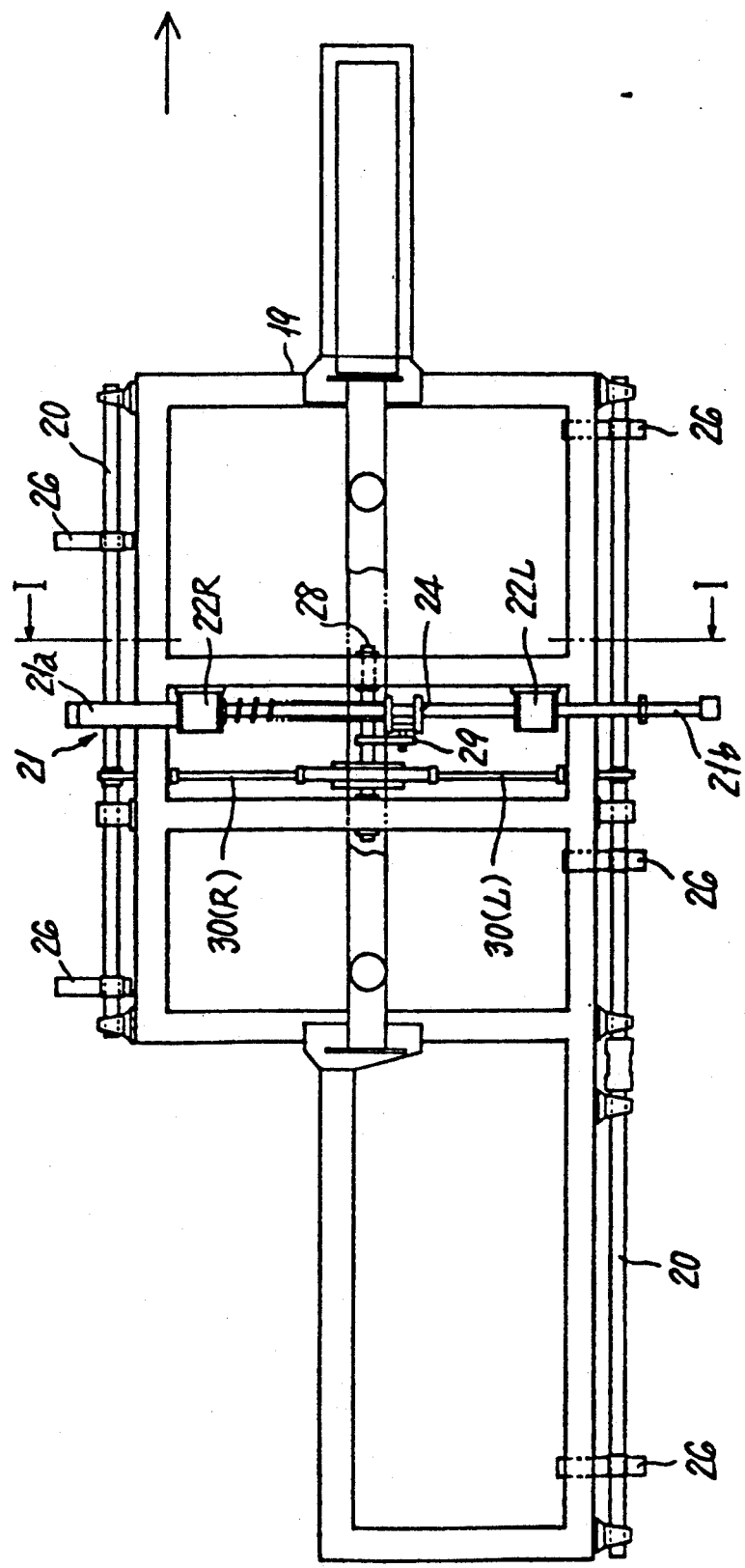
FIG. 3 is a schematic plan view of a hanger unit of the work conveying system of FIG. 1.

As shown in FIG. 1, each guide unit is connected to an immovable member 13 of a building structure, including a support arm 14, a rail 15, a drive roller 16, a guide roller 17, and supports 18. A plurality of the supports 18 are disposed substantially near the central portion of the hanger frame 19. Each support 18 is connected to the guide rail 15 via the drive roller as shown in FIG. 3. The guide unit is used for suspending and guiding hanger units 12 (described below).

Each hanger unit 12 includes, a hanger frame 19, rotatable shafts 20, hanger arms 26, a slide shaft 21, and a conversion mechanism 103 as shown in FIG. 1. The rotatable shafts 20 are located along opposite sides of the hanger frame 19.

Figure 4:
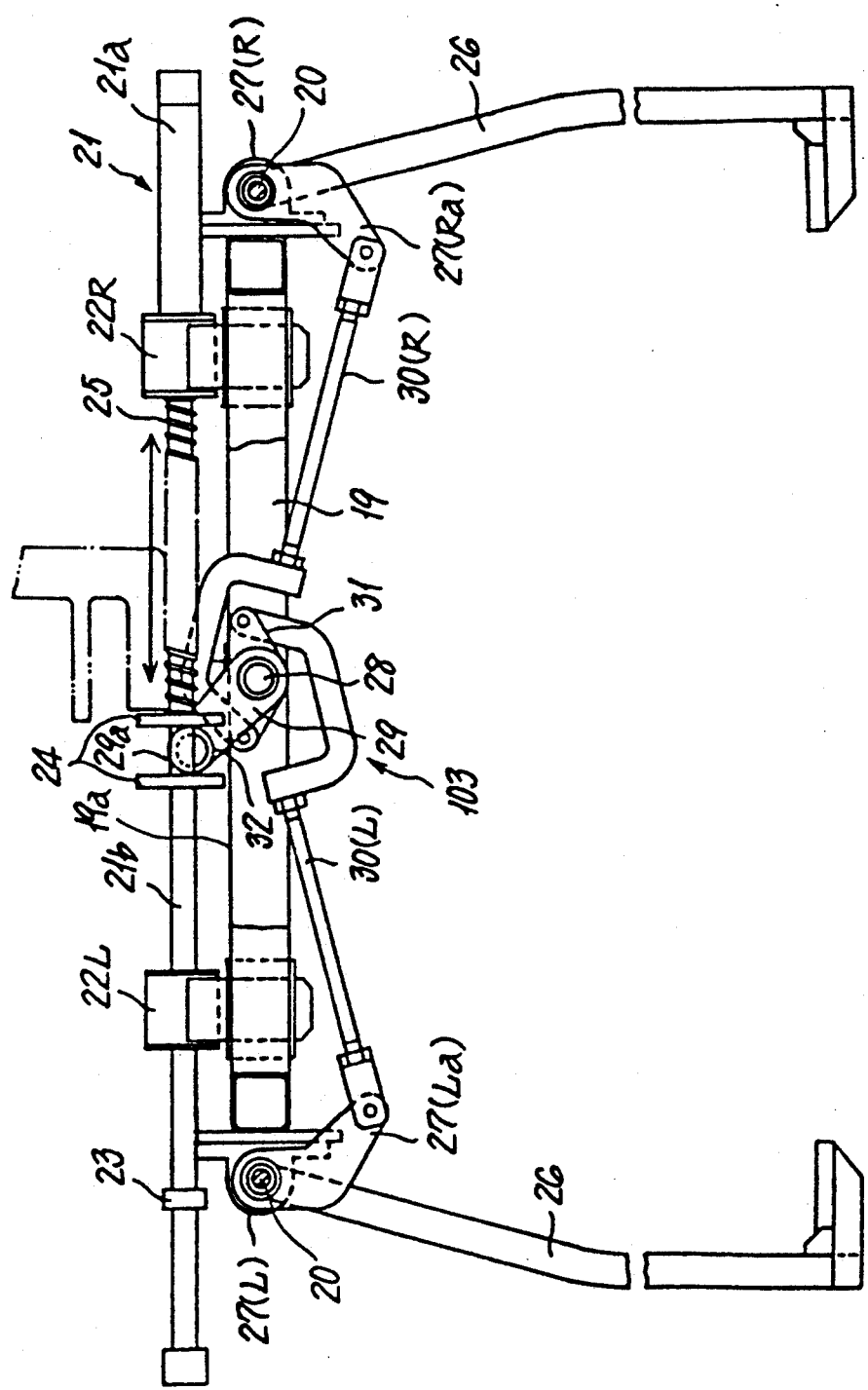
FIG. 4 is a front elevation of the hanger unit, taken along line I—I of FIG. 3, showing hanger arms in their closed state.

The slide shaft 21 is located across the hanger frame 19 so as to be orthogonal to the moving direction of the hanger frame 19, and is slidably supported by bearings 22L and 22R which are fixedly secured to the hanger frame 19 as shown in FIG. 4. The slide shaft 21 has a dual structure (at the right side in FIG. 4), having an outer shaft 21a and an inner shaft 21b. The outer shaft 21a is supported by the bearing 22R so as to make the inner shaft 21b slidable. The inner shaft 21b has the bearing 22L and a stop 23 on its left side (as seen in FIG. 4) and a pair of fixed plates 24 serving as a connector on its right side. The inner shaft 21b has a compression coil spring 25 wound therearound between the plates 24 and the bearing 22R. The compression coil spring 25 always urges the inner shaft 21b backwardly, i.e. leftwards in FIG. 4.

Each rotatable shaft 20 has axially a plurality of pairs of hanger arms 26, and a plurality of rocking arms 27(L) and 27(R) secured thereon. The hanger arms 26 are in the shape of the letter L, being used for sandwiching the work therebetween. The rocking arms 27(L) and 27(R) are in the shape of the sign of inequality, and constitute part of the conversion mechanism 103 for transmitting the movement of the slide shaft 21 to the rotatable shaft 20.

The conversion mechanism 103 also has a connecting member 29, links 30(L) and 30(R), and a movable piece 31. The connecting member 29 is connected at one end thereof to an axis 28 at the center of the hanger frame 19, and is sandwiched between the plates 24 at the other end thereof. The movable piece 31 is also connected to the axis 28. The link 30(L) is connected to a free end 27(La) of the rocking arm 27(L) at its one end, and to the movable piece 31 at its other end. The link 30(R) is also connected to a free end 27(Ra) of the rocking arm 27(R) and the movable piece 31 in the similar manner. The links 30(L) and 30(R) surround the axis 28 at their ends.

The connecting member 29 is engaged with the plates 24 so that a roller 32 at a free end of the connecting member 29 is loosely sandwiched between the plates 24. Thus, the connecting member 29 is rocked as the inner shaft 21b slides.

Now returning to FIG. 1, the opening-and-closing mechanism is located at the loading area A or B, or the work delivery area (shown in FIG. 2), so that the mechanism moves the hanger unit 12 which is travelling along the conveying route RH.

The opening-and-closing mechanism includes a pressure cylinder 39, and a pusher member 33. The pressure cylinder 39 moves the pusher member 33 between its operating position and non-operating position as described later, includes a piston (not shown) and a rod 39a extending therefrom, and is located at an upper part of a frame 34 near the work loading area A.

The pusher member 33 is a pressure cylinder having a movable rod 33a, and is secured to a base member 37 via a spacer 38. The pusher member 33 is movably suspended from the frame 34 via a bearing 35, a bracket 36, and a base member 37. The rod 39a of the cylinder 39 extends to the upper surface 37a of the base member 37.

The opening-and-closing mechanism is operated when the hanger unit 12 on the conveying route RH reaches the work loading area A.

When operated, the cylinder 39 reciprocates the piston (not shown) therein, pushing the rod 39a forwardly, which pushes the base member 37a. The base member 37a then pushes the pusher member 33 to the operating position. Thus, the slidable rod 33a pushes one end of the inner shaft 21b of the hanger unit 12.

When the hanger unit 12 on the conveying route RH is at the work loading area A, the slidable rod 33a of the pusher member 33 is positioned above the conveying route LH as shown by the solid line (i.e. an operating position) and confronts the end of the inner shaft 21b of the hanger unit 12. On the other hand, when another hanger unit 12 on the conveying route LH gets to the work loading area A, the pusher member 33 is retracted to the position indicated by the alternate long and two short dashes line (non-operating position).

The opening-and-closing mechanisms are also installed at the work delivery area 102 and the work loading area B.

Figure 5:
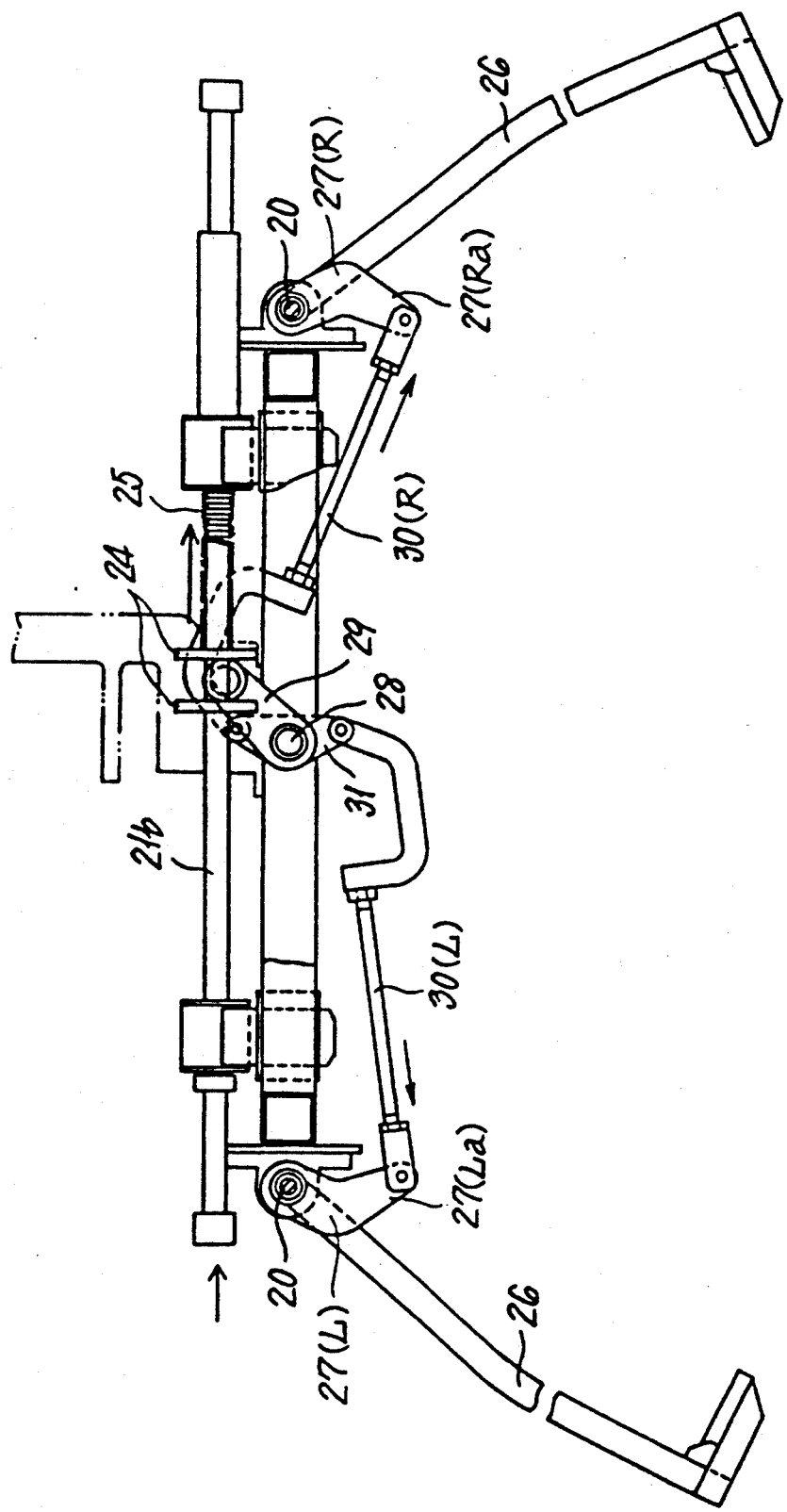
FIG. 5 is a view similar to FIG. 4, showing the hanger arms in their open state.
Figure 6:
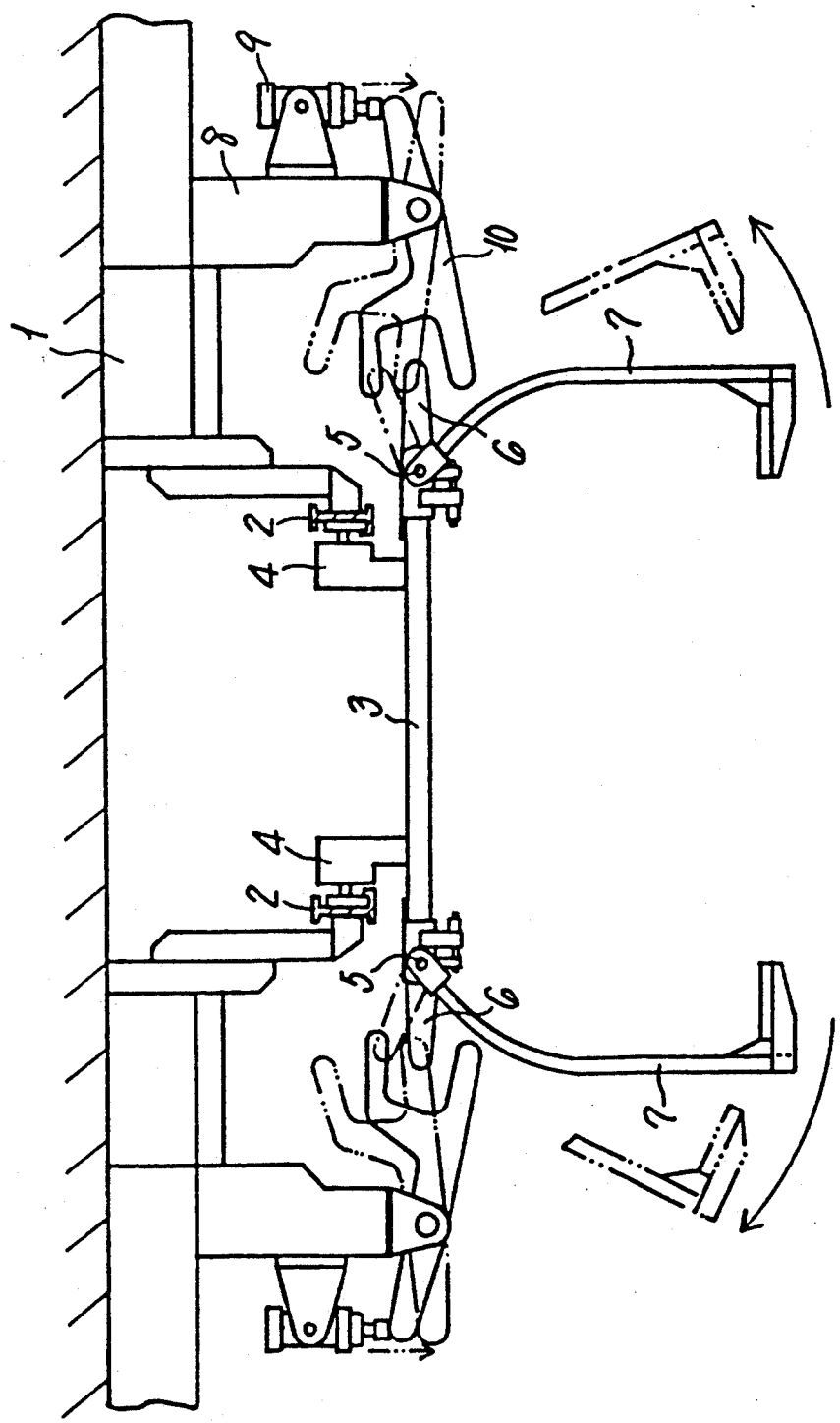
FIG. 6 is a front view of a work conveying system of the related art.

In operation, when the hanger unit 12 on the route RH reaches the work loading area A, the pressure cylinder 39 operates to move the pusher member 33 to the operating position above the conveying route LH. Then, the slidable rod 33a pushes the end of the inner shaft 21b of the hanger unit 12. As shown in FIG. 5, the inner shaft 21b is pushed and slides in the direction shown by arrows against the bias of the coil spring 25. In response to this, the connecting member 29 and the movable piece 31, which are engaged with the plates 24, rotate clockwise (in the plane of FIG. 5) around the shaft 28, thereby pushing the links 30(L) and 30(R) outwardly from the shaft 28. These links 30(L) and 30(R) rock the rocking arms 27(L) and 27(R), which rotate the shafts 20, so that the hanger arms 26 change the closed state (shown in FIG. 4) to the open state (shown in FIG. 5).

If the hanger arms 26 are free under this condition, they remain open until they are loaded with a work. Once the hanger arms 26 sandwich the work therebetween, the pusher member 33 is released, so that the hanger arms 26 are elastically urged toward the closed positions by the resilience of the coil spring 25.

When the hanger unit on the route RH leaves from the work loading area A, the cylinder 39 slides its rod 39a to retract the pusher member 33 to the non-operating position shown by the alternate long and two short dashes line, thereby allowing an incoming hanger unit 12 on the route LH to pass through the work loading area A and to reach the work loading area B. Then, the hanger unit 12 is opened by another opening-and-closing mechanism at the work load area B to receive a work to be carried.

The hanger unit 12 holding the work with its hanger arms 26 is conveyed to the work delivery area 102, delivering the work to the floor line 101.

As described so far, the pusher member is moved between the operating position and non-operating position by the operation of the pressure cylinder, so that the hanger units on the conveying route LH can move without interference of this opening-and-closing mechanism.

Since the hanger arms are always urged to assume the closing state by the resilience of the coil spring 25 via the conversion mechanism 103, the hanger arms 26 can hold the work with a strong force and be protected against being opened by the weight of the work to be carried or their own rocking motion.

In addition, the conversion mechanism 103 and the slide shaft 21 of the hanger frame 12 enable the hanger arms 26 to be opened only by pushing the slide shaft 21 from one side, thereby reducing the size of the openingand-closing mechanism compared with that of the conventional conveying system, and requiring a smaller installation space.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A work conveying system for use in a car body assembling line, comprising:

a plurality of hanger units;

a first conveying route and a second conveying route for guiding said hanger units, said first and second conveying routes being disposed in parallel with each other on a ceiling of a factory building, and having a narrowed distance therebetween at a position where said hanger units are opened and closed;

at least one opening-and-closing means located in the vicinity of said first conveying route at a position where said hanger units are opened and closed;

wherein when each said hanger unit on said second conveying route reaches the position where it is to be opened and closed, said opening-and-closing means operates toward said second conveying route so as to open said hanger unit to receive therein a work to be carried, and when each said hanger unit on said first conveying route reaches the position where it is to be opened or closed, said opening-and-closing means is retracted to a non-operating position from said first conveying route.

2. A work conveying system according to claim 1, wherein each said hanger unit includes:

a frame;

rotatable shafts disposed along opposite sides of said frame;

a pair of hanger arms each of which is connected to said rotatable shafts at one end thereof and is movable at the other end thereof;

a slide shaft which is located on said frame and is pushed by said opening-and-closing means so as to be slidable when said hanger unit reaches the open-and-close position;

a conversion mechanism for converting the sliding motion of said slide shaft into a force for moving said hanger unit so as to open said hanger arms, and an elastic member for applying resistance to said slide shaft which is moved so as to open said hanger arms.

3. A work conveying system according to claim 2, wherein said opening-and-closing means takes, according to operating conditions of said hanger units, an operating position where said opening-and-closing means confronts one end of said slide shaft of said hanger unit moving on said second conveying route and slides said slide shaft so as to open said hanger arms of said hanger unit, and takes a non-operating position where said opening-and-closing means does not interfere with the movement of said hanger unit on said first conveying route.

4. A work conveying system according to claim 2, wherein said conversion mechanism includes:

links for connecting said slide shaft and said rotatable shaft; and a connecting member which is engaged with part of said links and fixedly secured to said slide shaft so as to transmit the sliding motion of said slide shaft to said links.

5. A work conveying system according to claim 2, wherein said elastic member urges said hanger arms to be closed.

6. A work conveying system according to claim 4, wherein said links have their rotation center below an upper surface of said hanger frame.

7. A work conveying system according to claim 1, wherein said opening-and-closing means includes a rod operated by a hydraulic pressure or an air pressure.

* * * * *